United States Patent [19]
Ward et al.

[11] Patent Number: 5,938,061
[45] Date of Patent: Aug. 17, 1999

[54] CENTRAL VACUUM INLET MOUNTING PLATE WITH REMOVABLE PROTECTOR

[75] Inventors: John Ward, Midhurst; Jim McKee, Barrie, both of Canada

[73] Assignee: Canplas Industries Ltd., Barrie, Canada

[21] Appl. No.: 08/534,884

[22] Filed: Sep. 27, 1995

[51] Int. Cl.⁶ .............................. H02G 3/12; H02G 3/14
[52] U.S. Cl. ............................... 220/242; 174/55; 174/67
[58] Field of Search ................................... 220/242, 241, 220/254, 258, 266; 215/300, 299, 298, 296, 256, 253; 200/61.6; 174/66, 67, 55; 137/360; 277/1, DIG. 10

[56] References Cited

U.S. PATENT DOCUMENTS

| | | |
|---|---|---|
| 871,364 | 11/1907 | Schmidt .............................. 215/363 X |
| 1,099,680 | 6/1914 | Weirich . |
| 1,875,224 | 8/1932 | Despard . |
| 2,174,811 | 10/1939 | White . |
| 2,248,201 | 7/1941 | Russell et al. . |
| 2,806,941 | 9/1957 | Graziani . |
| 3,034,085 | 5/1962 | Pauler et al. . |
| 3,036,170 | 5/1962 | Forney ................................... 200/61.6 |
| 3,076,068 | 1/1963 | Racklyeft . |
| 3,127,227 | 3/1964 | Edwards . |
| 3,173,164 | 3/1965 | Congdon . |
| 3,195,095 | 7/1965 | Field . |
| 3,258,553 | 6/1966 | Breslin . |
| 3,283,093 | 11/1966 | Bishop . |
| 3,291,927 | 12/1966 | Riley, Jr. et al. ....................... 200/61.6 |
| 3,314,039 | 4/1967 | Opper . |
| 3,335,744 | 8/1967 | Hanford . |
| 3,341,944 | 9/1967 | Ligon . |
| 3,465,111 | 9/1969 | Breslin . |
| 3,470,521 | 9/1969 | Downey . |
| 3,483,503 | 12/1969 | Paradiso . |
| 3,565,103 | 2/1971 | Maselek . |
| 3,661,356 | 5/1972 | Tucker . |
| 3,812,444 | 5/1974 | Reno . |
| 3,895,732 | 7/1975 | Robinson et al. . |
| 4,036,389 | 7/1977 | Pate et al. . |
| 4,059,327 | 11/1977 | Vann . |
| 4,211,457 | 7/1980 | Meadows . |
| 4,336,427 | 6/1982 | Lindsay ................................... 200/61.6 |
| 4,402,516 | 9/1983 | Gans et al. ............................... 277/1 X |
| 4,473,923 | 10/1984 | Neroni et al. . |
| 4,494,815 | 1/1985 | Brzostek et al. . |
| 4,525,918 | 7/1985 | Puritz . |
| 4,550,958 | 11/1985 | Smith . |
| 4,602,504 | 7/1986 | Barber .......................... 277/DIG. 10 X |
| 4,618,195 | 10/1986 | Keane . |
| 4,639,055 | 1/1987 | Keane . |
| 4,652,063 | 3/1987 | Genoa et al. . |
| 4,664,457 | 5/1987 | Suchy . |
| 4,732,397 | 3/1988 | Gavin .......................... 277/DIG. 10 X |
| 4,735,579 | 4/1988 | Muser . |
| 4,758,170 | 7/1988 | Hayden . |
| 4,815,747 | 3/1989 | Wolford ...................... 277/DIG. 10 X |
| 4,840,574 | 6/1989 | Mills . |
| 4,895,528 | 1/1990 | Choiniere et al. . |
| 4,902,043 | 2/1990 | Zillig et al. ................. 277/DIG. 10 X |
| 4,915,640 | 4/1990 | Hayden . |
| 4,920,456 | 4/1990 | Pirdzuns . |
| 4,990,094 | 2/1991 | Chandler et al. . |
| 5,263,502 | 11/1993 | Dick ........................................ 137/360 |
| 5,507,501 | 4/1996 | Palmer ........................ 277/DIG. 10 X |
| 5,578,795 | 11/1996 | Ward . |

FOREIGN PATENT DOCUMENTS

| | | |
|---|---|---|
| 1268795 | 5/1990 | Canada . |
| 1267174 | 12/1990 | Canada . |

OTHER PUBLICATIONS

MetFlo Brochure H.P. Products Inc. 1988 Part No. 1200.
Hayden T–31–MP 3 pages.
Distributor Price List, H–P Products Inc., Mar. 18, 1985.

Primary Examiner—Stephen Castellano
Assistant Examiner—Niki M. Eloshway

[57] ABSTRACT

A backing plate for an inlet valve for a central vacuum system is disclosed. The backing plate includes a tubular portion, which on one side is secured to vacuum conduits, and on the other side carries a vacuum opening having a rubber seal. The backing plate further includes a removable protective element or router disc to protect the rubber seal, such as for example during installation of dry wall over the backing plate.

12 Claims, 5 Drawing Sheets

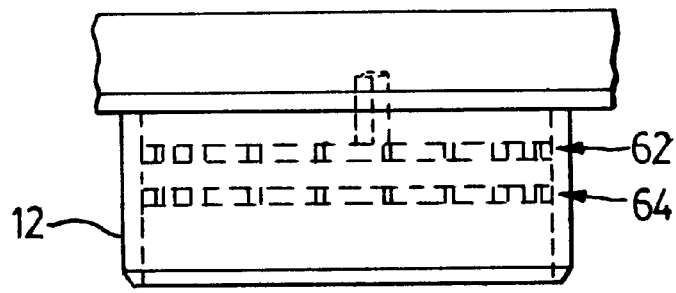
FIG. 6
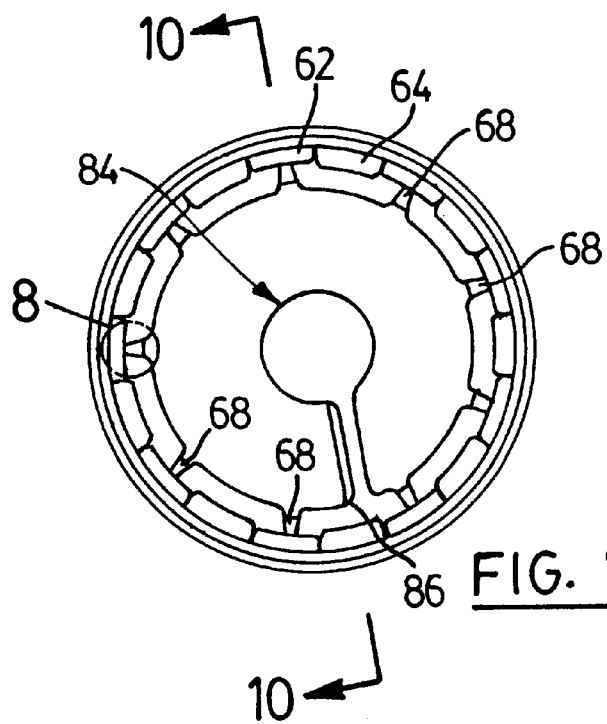
FIG. 7
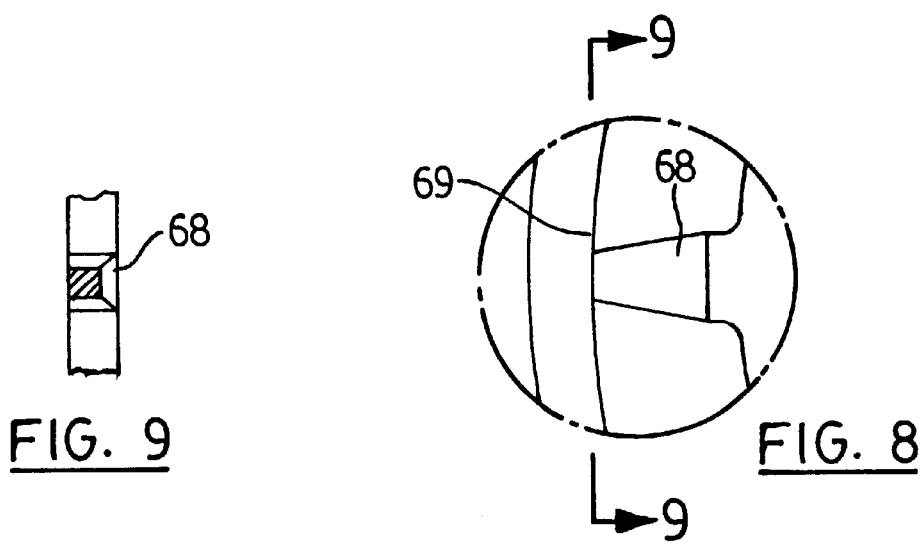
FIG. 9
FIG. 8

CENTRAL VACUUM INLET MOUNTING PLATE WITH REMOVABLE PROTECTOR

FIELD OF THE INVENTION

This invention relates generally to the field of central vacuum systems in which a central vacuum source is connected by conduits to various valves located inside a dwelling or other building. In particular this invention relates to a component used in the valve assemblies through which portable suction hoses may be attached to the central vacuum system.

BACKGROUND OF THE INVENTION

In central vacuum systems there are two main types of components, namely built in components and portable components. The built in components consist of the central vacuum motor which is typically installed in a basement or garage of a dwelling, and plastic conduits which run under floors and inside walls and are connected to the vacuum motor. The conduits are typically provided with wall mounted inlet valves. The portable components typically comprise a hose, having a wand at the end, which in turn has a head. Passive and active heads are used with active heads such as beater bars being more popular for carpeted surfaces.

In such central vacuum systems the portable components are connected to the built in components at fittings commonly referred to as inlet valves. The valves are usually mounted in walls and are provided with a hinged cover which seals a vacuum opening. A hose cuff is provided on the hose which mates with and seals with the vacuum opening in the valve, which becomes exposed when the hinged cover is lifted.

Most usually the valve is comprised of a number of different elements which are attached together to form an assembly. In the past there have been many different types of inlet valve assemblies for the purpose of providing a convenient hose attachment for central vacuum systems. Such assemblies usually comprise a backing or mounting plate, which is attached to a wall stud or the like and a cover plate or valve which is inserted into the backing or mounting plate and which carries the hinged cover for the vacuum opening. The vacuum conduit is usually attached to the back of the backing plate and wires may be run along side the conduit to pass through the backing plate and to connect to switches or contacts for engaging the vacuum motor. Thus when the hose cuff of the portable hose is inserted into the vacuum opening, a low voltage circuit is closed and the vacuum motor is engaged. An example of this type of fitting is shown in U.S. Pat. No. 4,336,427 to Lindsay.

Typically, a rubber seal or gasket is provided between the cover plate and the backing plate to ensure a good vacuum tight seal. When the rubber gasket or seal is mounted inside of the vacuum opening in the backing plate, it becomes partially exposed and thus is susceptible to damage during installation of the drywall over or around the fitting. Typically in new house installations, the backing plate will be mounted onto the end of the conduit and then nailed to an adjacent stud. For backing plates having a perimeter wall, it has been discovered that it is common for the drywall installer to use a router to define an opening in over mounted drywall. As the router is passed across the face of the backing plate, it may have a tendency to slip into the vacuum opening in the backing plate and damage the rubber seal or gasket. A damaged seal results in a loss of suction which can impair the effectiveness of the central vacuum cleaning system. Additionally, there is a risk that blocking debris may become lodged in the vacuum tube, since the pipe opening is fully exposed during this operation.

SUMMARY OF THE INVENTION

What is required therefore is a way of protecting the seal from being damaged during installation of the drywall over and around the backing plate and for preventing unwanted debris from being lodged in the exposed tubing. Preferably such protection would not interfere with the ease of use of the backing plate or inlet valve, but would still prevent the seal from being damaged and requiring replacement. Therefore, according to the present invention, there is provided a mounting plate for use in an inlet valve assembly for a central vacuum system, the mounting plate comprising a generally rectangular body having an elongate tubular section having a seal mounting means located on an interior surface therefore, a plurality of fastener openings formed in the body to receive fasteners, and a removable protector mounted in the elongate tubular section.

BRIEF DESCRIPTION OF THE DRAWINGS

Reference will now be made to the following Figures which describe preferred embodiments of the invention and in which

FIG. 6 is a side view of the tubular section of FIG. 5;

FIG. 7 is a plan view of the tubular section of FIG. 5;

FIG. 8 is an enlarged view of circle 8 of FIG. 7;

FIG. 9 is a view along lines 9—9 of FIG. 8; and

DETAILED DESCRIPTION OF PREFERRED EMBODIMENTS

Figures 1, 2:
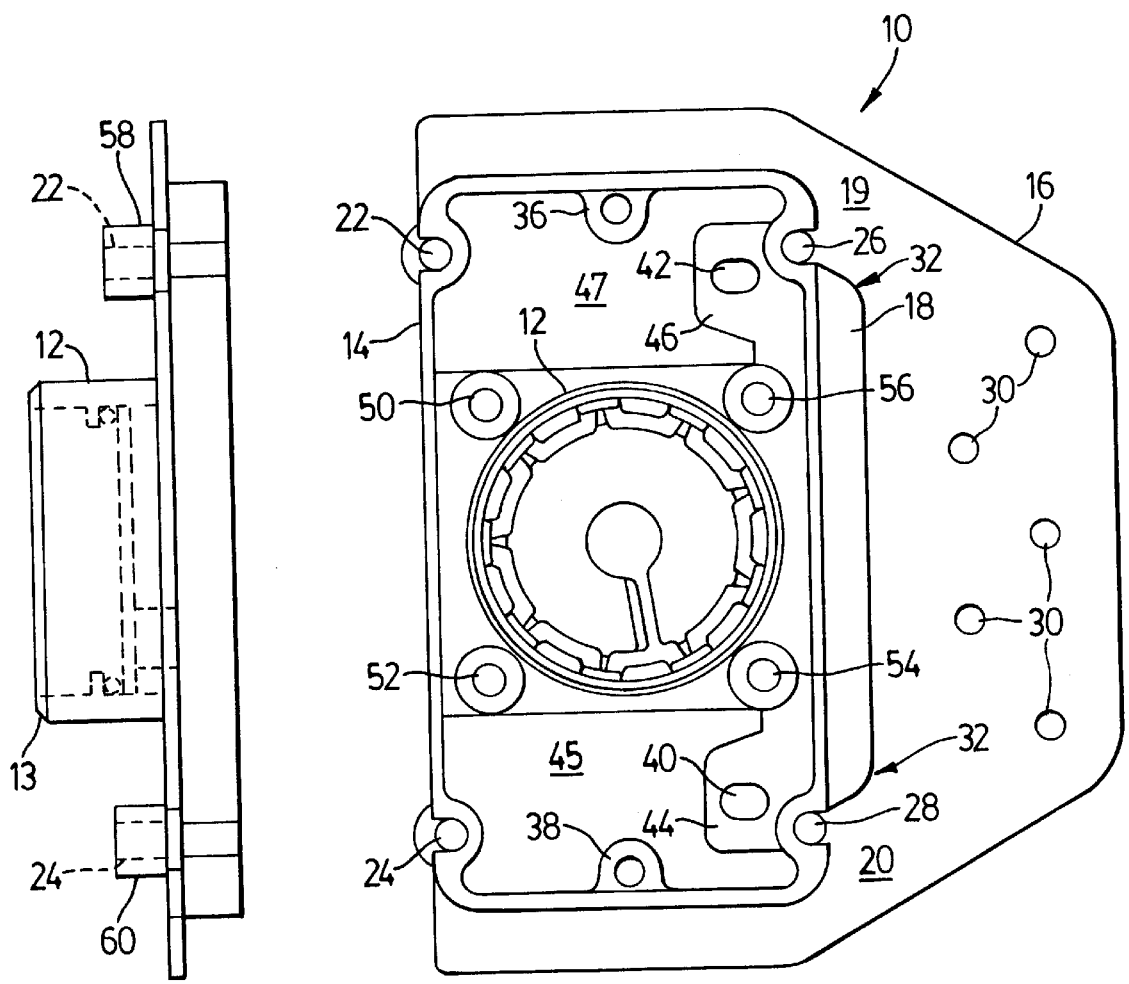
FIG. 1 is a plan view of a vacuum plate according to the present invention.
FIG. 2 is a side view of the vacuum plate of FIG. 1.

FIG. 1 shows a backing plate indicated generally at 10 according to the present invention. The backing plate includes a tubular section 12, a continuous perimeter wall 14 and a side flange 16. An opening 18 separates the side flange 16 from the mounting plate 10 except for lands 19 and 20 located at the top and the bottom respectively.

Partially formed in the side wall 14 are a plurality of openings 22, 24, 26, 28, 36 and 38 which are intended to accept fasteners such as screws or the like. Wire loop holes 40 and 42 are provided on flanges 44 and 46 which extend into openings 45 and 47 respectively. Further, four mounting openings 50, 52, 54 and 56 are shown located around the perimeter of the tubular portion 12. While any specific configuration of openings 22, 24, 26, 28, 36, 38, 50, 52, 54 and 56 can be used, it has been found that the configuration of the openings as shown is preferred, because this configuration is generally universal; a majority of the inlet valve cover plates presently in the trade are accommodated by this pattern of openings.

As can be seen in the side view, in FIG. 2, the apertures 22 and 24 include rearward extensions 58 and 60 which provide enough material for a fastener such a screw to be firmly gripped. Also, the tubular portion 12 can be seen extending rearwardly from the plane of the plate 10. The tubular portion 12 preferably ends with chamfered end portion 13.

Figure 3:
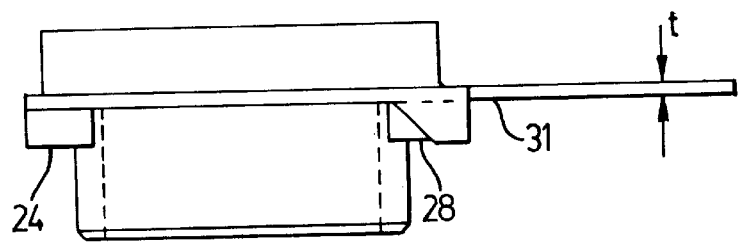
FIG. 3 is a top view of the backing plate of FIG. 1.

In FIG. 3, it can be seen that the side mounting flange 16 is relatively thin as compared to the balance of the backing plate and is attached at the side edge to the backing plate. The preferred thickness t for the flange 16 is 0.060 inches, and it is preferred to form a plurality of preformed nailing or other fastener holes 30 in the flange to facilitate the attachment of the flange to a stud or the like. Further a gentle curve is preferred to define the lower and upper borders of the opening 18, as shown by arrow 32. This curve, in combination with a tapering of thickness as shown at 31 in FIG. 3, helps ensure that a break off line for the flange is generally parallel to the side edge of the backing plate. It will be appreciated that scoring or other techniques could also be used to cause the flange to break along the desired line adjacent to the side edge of the backing plate.

Figure 4:
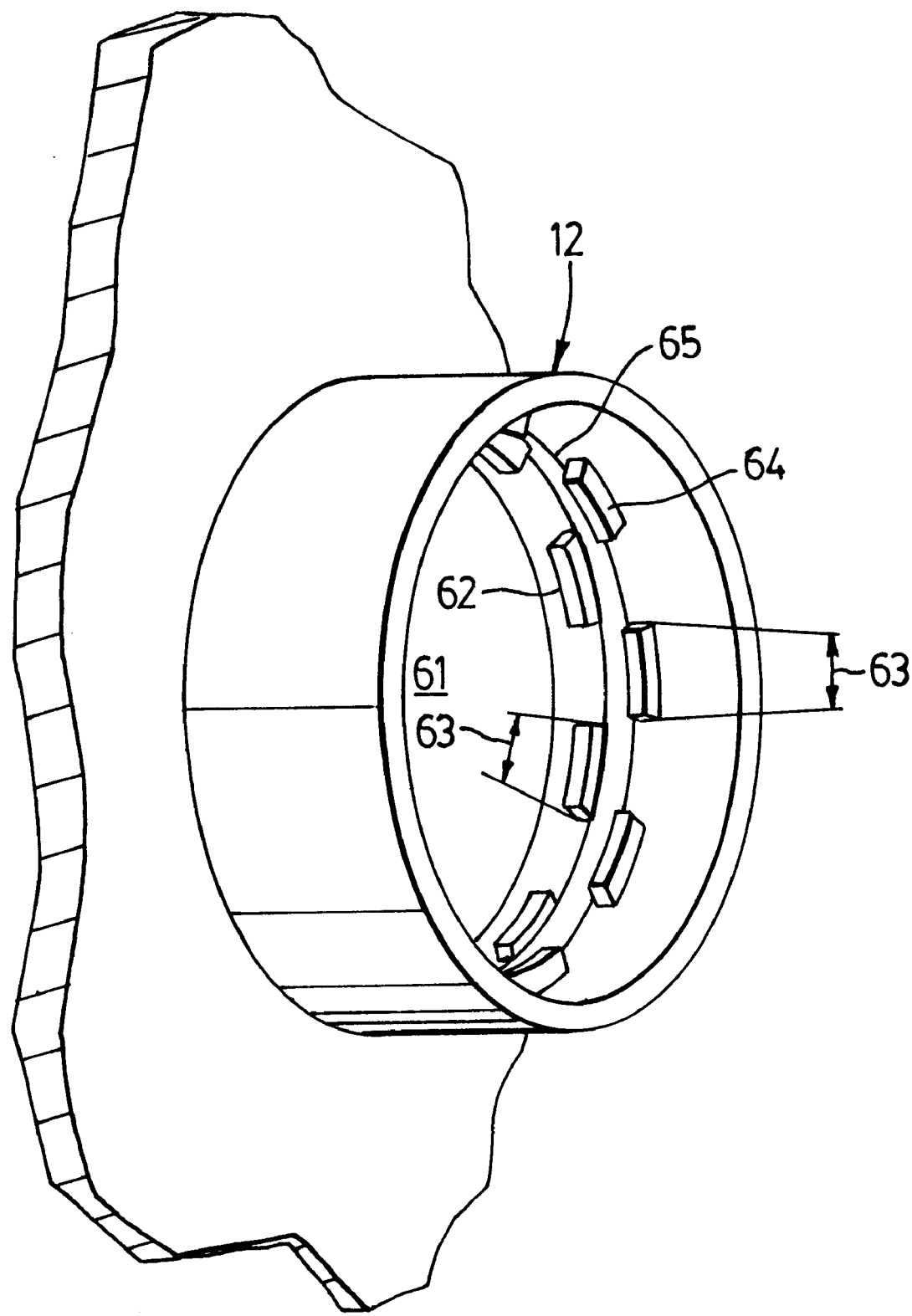
FIG. 4 is an enlarged view from the rear of a tubular section of the backing plate of FIG. 1.

Turning to FIG. 4, the tubular section 12 is shown in larger view with the vacuum opening 61. The tubular section includes a plurality of forward and rearward castellations indicated as 62 and 64 respectively. Each castellation is canted slightly towards the opposing row of castellations and is preferably placed opposite to a space formed in the facing row of castellations. In this manner, the rows of castellations can grip a sealing member, such an O-ring 65, securely. Thus, it is unlikely that the sealing O-ring or gasket will be accidentally pulled or sucked out of the castellations. The castellations are preferably formed with a taper, so a broader base is adjacent to the O-ring 65. This is indicated by the angled lines with arrows 63. The taper facilitates molding the castellations. The preferred form of the sealing ring is a # 130. The castellations may be 0.045 inches thick, and need to extend out from the tubular section enough to grip the preferred sealing ring. Good results have been achieved using nine castellations in each row, evenly spaced about the inside perimeter of the tubular section. More or less could be used, however, by varying the length of each castellation.

Figure 5:
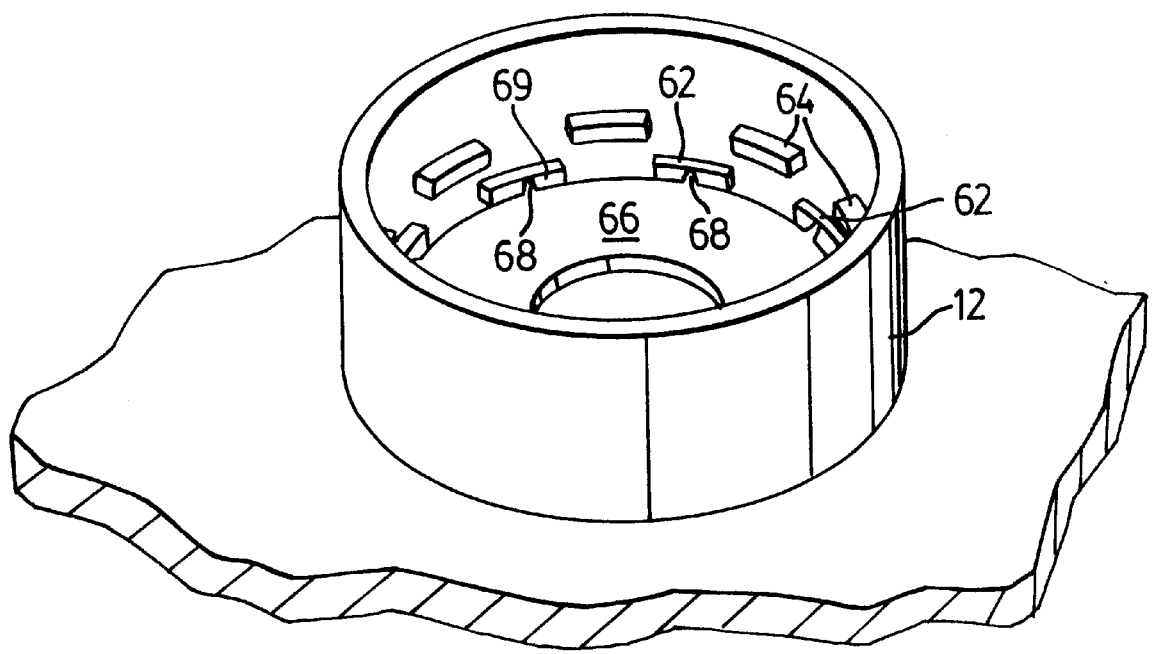
FIG. 5 is the view of FIG. 4 showing a removable protector.

FIG. 5 shows the same view as FIG. 4 except that the removable protective element 66 is shown. As can be seen, a plurality of thin webs 68 extend from the main body of the protective element (which may be referred to as a router disk) across to an inner surface 69 of the castellations 62. In the most preferred embodiment, the attachment points are formed on the forward, or outward row of castellations. This facilitates the molding, in one piece, of the fitting with removable seal protector. In this sense it will be appreciated that the reference to the forward or outward position is to the position which the removable protective element 66 takes relative to the seal when the backing plate is installed on a stud or the like. The requirement is for the protective element 66 to be interposed between the potential source of damage (such as a router) and the part needing protection (the seal and tubular portion).

FIG. 6, is a side view of the tubular portion, as well as the castellations 62, 64 in dotted outline. As can be seen they are formed in two parallel rows in which the opposed rows are spaced offset from each other. The ideal seal will be flexible and thus will have a tendency to be bent around each castellation, in an alternating or wavy pattern. This has been found effective to hold the seal in place against forces occurring when the cover plate of the valve assembly is inserted and withdrawn from the backing plate.

As can be seen in FIG. 7, and in particular FIG. 8, each web 68 which extends between the protective element and tubular portion narrows or tapers. Good results have been achieved with a web that is 0.07 by 0.063 inches in cross section at the point where it emerges from the protective disk 66, and tapers to a 0.025 by 0.025 inch cross sectional area where the web joins the surface 69 of the castellations of the tubular portion (shaded portion of FIG. 9). It is preferred to form the taper on the side of the web 68 proximal to the seal, but other configurations are also possible as will be appreciated by those skilled in the art. FIG. 9 shows that the cross-sectional area of the web is smallest at the contact point with the castellation.

By tapering the web 68 as shown, the point of failure of the web 68 will be adjacent to the top of the castellation. There is a certain tolerance for there to be disconformities or vestiges of plastic left on the inner surface of the castellation, once the protective element 66 has been torn out. Essentially this tolerance is defined by the difference in height of the castellations 62, 64, and the thickness of the sealing ring 65. To prevent the vestiges of plastic from interfering with the seal, it is most preferred to cause the webs 68 to separate as close as possible to the surface of the castellation. It will be appreciated by those skilled in the art that other configurations can also be used, provided they are sized and shaped to permit the seal to function properly.

Figure 10:
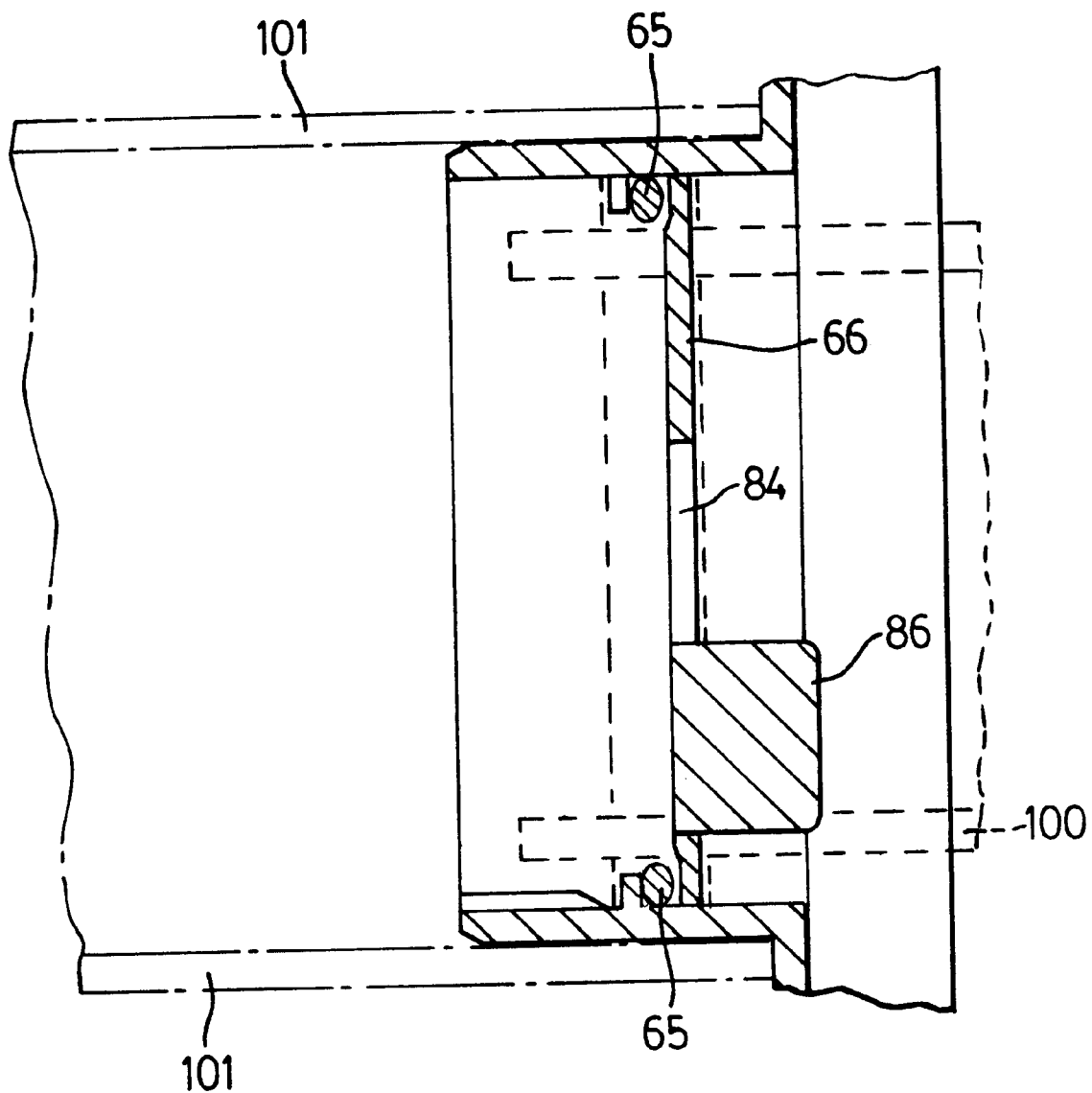
FIG. 10 is a cross-sectional view of the tubular section of FIG. 5.

The removable protective element 66 is shown with a central opening at 84. A finger tab 86 is provided which allows the removable element 66 to be gripped as shown in FIG. 10. As the element is gripped and pulled, successive webs of the element are broken one at a time. In this manner, the protective element can be easily withdrawn from the tubular portion 12. Shown in dotted outline in FIG. 10 as 100 is a portion of a cover plate or valve, which is inserted into the tubular portion 12, to form a complete assembly. The portion 100 seals against seal 65 as shown and may be simply pulled in and out as needed. Also shown is conduit 101 which surmounts the tubular portion 12.

Good results have been achieved by forming the router disk 66 from 0.063 inches thick material, and having the central opening about 0.5 inches in diameter. With these dimensions it has been found that the router disk 66 may be readily manipulated to pull the same away from the tubular section 12. Further, by making the finger tab 86 extend slightly above the plane defining the opening of the vacuum inlet tubular portion 12, the easy manipulation of the finger tab 86 is achieved. It is preferred to avoid projecting the finger tab too far into the space where a router might be expected to pass during installation of the overmounted drywall. It will be appreciated that what is desired is to position the finger tab 86 in a manner that balances the risk of it being in the way during installation with the desire for the finger tab to be easily accessed for removing the router disk.

In FIG. 10, it can now be appreciated how the present invention operates. Turning to FIG. 1, the backing plate 10 can be positioned as necessary on a stud or the like where the end of the vacuum conduit is located. In some cases, it may not be necessary to attach the mounting flange to an adjacent stud, in which case, the flange can simply be broken off along the line of the opening 18.

Once the backing plate 10 is secured in position, a drywall installer can press drywall over the top of it. Then, using a router, and guided by the inside edge of the perimeter wall 14, a drywall installer can form an opening in the drywall which exactly matches the perimeter wall. During the process, the removable protective cover will be protecting the damageable rubber seal 65. Further, debris and other blocking material will be prevented from entering into the vacuum system through the tubular part 12 of the fitting 10. Once the drywall is installed, and it is necessary to insert an inlet valve 100, then the protective element 66 can simply be gripped at 86 and pulled away from the internal surface of tubular portion 12. Because the webs 70 will break adjacent to the internal surface of the tubular element 12, any disconformities caused or vestiges left will be hidden below the level of the seal 65, or the castellations 62, 64 depending where the webs attach. Thus, they will not interfere in any way with the ability of a good vacuum seal to be formed between the inlet valve 100 and the seal 86 mounted in the mounting plate 10.

Although the most preferred form of the invention is to have the removable cover attach to the tubular section on the castellations, it will be appreciated that the attachment could also be achieved at other points along the tubular portion 12, closer to the outside edge. However for maximum protection of the seal 65 and to ensure that the protective element 66 is not prematurely broken or removed, it is preferred to mount it in the tubular section at or about the castellations 62, 64, as shown. Also, during molding, the castellation forming parts of the molds act as "gates" for the castellation webs which facilitates consistent molding results. Of course, if the castellations were to be replaced with a continuous lip, the protective element 66 could be anchored to such a continuous lip or anywhere on the inside tubular portion.

Further, although the most preferred form of the invention is to integrally form the removable cover at the time the backing plate is formed, the present invention also comprehends the removable cover being separately molded and simply press fit into position. However this is less preferred because of the problems of separate assembly being required and that any such press fit protective element is more likely to become unintentionally separated leading to a premature loss of protection for the seal and tubular portion.

It will be appreciated by those skilled in the art that while the foregoing makes reference to a preferred embodiment of the invention, various modifications and alterations can be made without departing from the spirit or the scope of the invention. For example, while reference has been made to the removable protective element 66 being attached to the castellations, it could be attached anywhere along the tubular portion 12, provided that protection was provided to the seal 65 and that any plastic vestiges left over when the disk 66 is removed do not interfere with the ability to form a good seal between seal 65 and tube 100 of the inlet valve.

The embodiments of the invention in which an exclusive property or priveledge is claimed are defined as follow:

1. A mounting plate for use in an inlet valve assembly for a central vacuum system, the mounting plate having an outer face and an inner face, the mounting plate comprising:

a generally ractangular body having an elongated tubular section having a seal mounting means located on an interior surface thereof;

a sealing means carried in said mounting means;

a plurality of fastener openings formed in the body to receive fasteners; and a removable protector element integrally molded inside said elongated tubular section adjacent to said seal mounting means and between said outer face and said seal mounting means and having a generally circular outer circumference having
   a plurality of attachment points with said interior surface comprising breakable connections to said tubular section and
   a plurality of gaps around said outer circumference between said attachment points, said breakable connections positioned relative to said sealing means wherein after said breakable connections are broken and said removable protector element is removed, and disconformities caused in said tubular section at said breakable connections do not interfere with a seal made at said sealing means.

2. The mounting plate of claim 1 wherein said breakable connections are in the form of webs which taper towards a connection to said elongate tubular section.

3. The mounting plate of claim 2 wherein said webs are thinnest in cross-section at a break off point to promote separation at the connection to reduce vestiges.

4. The mounting plate of claim 1 wherein the gaps are at least partially blocked by said seal.

5. The mounting plate of claim 1 wherein the seal mounting means comprises a plurality of castellations extending inwardly from said interior surface of said elongate tubular section.

6. The mounting plate of claim 5 wherein said interiorly extending castellations comprise opposed rings of castellations dimensioned to receive and retain a sealing member therebetween.

7. The mounting plate of claim 6 wherein said removable protector element includes a finger tab for enabling said removable protector to be gripped and broken out of said elongate tubular section.

8. The mounting plate of claim 7 wherein said removable protector element includes a central opening to facilitate bending of the removable protector during removal from the elongate tubular section.

9. The mounting plate of claim 8 wherein said body includes an opening above and below said elongate tubular section.

10. The mounting plate of claim 9 wherein the body includes a stud mounting flange.

11. The mounting plate of claim 10 wherein the stud mounting flange comprises a flat member attached at an upper and a lower end to said body.

12. The mounting plate of claim 11 wherein the stud mounting flange further includes preformed fastener holes formed therein.

* * * * *